(12) United States Patent
Gore et al.

(10) Patent No.: US 12,278,767 B2
(45) Date of Patent: Apr. 15, 2025

(54) DYNAMIC TRAFFIC THROTTLING

(71) Applicant: salesforce.com, inc., San Francisco, CA (US)

(72) Inventors: Ravindra G. Gore, Fremont, CA (US); Benjamin Fry, Berkeley, CA (US); Chaitanya Bhatt, Fremont, CA (US)

(73) Assignee: Salesforce, Inc., San Francisco, CA (US)

( * ) Notice: Subject to any disclaimer, the term of this patent is extended or adjusted under 35 U.S.C. 154(b) by 743 days.

(21) Appl. No.: 17/454,884

(22) Filed: Nov. 15, 2021

(65) Prior Publication Data
US 2023/0155940 A1 May 18, 2023

(51) Int. Cl.
*H04L 47/122* (2022.01)
*H04L 41/0816* (2022.01)
*H04L 41/0896* (2022.01)
*H04L 41/22* (2022.01)
*H04L 43/045* (2022.01)
(Continued)

(52) U.S. Cl.
CPC ........ *H04L 47/122* (2013.01); *H04L 41/0816* (2013.01); *H04L 41/0896* (2013.01); *H04L 43/062* (2013.01); *H04L 43/0876* (2013.01); *H04L 43/0882* (2013.01); *H04L 43/0888* (2013.01); *H04L 43/16* (2013.01);
(Continued)

(58) Field of Classification Search
CPC ............. H04L 41/0896; H04L 41/0816; H04L 43/062; H04L 43/0876; H04L 43/0882; H04L 43/0888; H04L 43/045; H04L 43/16; H04L 47/122; H04L 47/25; H04L 47/30
See application file for complete search history.

(56) References Cited

U.S. PATENT DOCUMENTS 5,577,188 A 11/1996 Zhu
5,608,872 A 3/1997 Schwartz et al.
(Continued)

FOREIGN PATENT DOCUMENTS

EP 3547625 B1 * 6/2021
EP 3952256 B1 * 4/2024
(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — David R Lazaro
*Assistant Examiner* — Robert A Shaw
(74) *Attorney, Agent, or Firm* — Weaver Austin Villeneuve & Sampson LLP

(57) ABSTRACT

Disclosed are examples of systems, apparatuses, methods, and computer program products for dynamic traffic throttling. A server system can receive, via an edge worker associated with a content delivery network (CDN), a first set of requests to access a first site. The server system can determine that traffic to the first site is to be throttled. The server system can determine a throttling rate. The server system can transmit instructions to the edge worker, the instructions configured to cause the edge worker to direct at least a portion of a second set of requests to access the first site to a waiting room site prior to being directed to the first site, the direction of the at least the portion of the second set of requests to the waiting room site being subject to the throttling rate.

20 Claims, 7 Drawing Sheets

(51) Int. Cl.
*H04L 43/062* (2022.01)
*H04L 43/0876* (2022.01)
*H04L 43/0882* (2022.01)
*H04L 43/0888* (2022.01)
*H04L 43/16* (2022.01)
*H04L 47/25* (2022.01)
*H04L 47/30* (2022.01)

(52) U.S. Cl.
CPC .............. *H04L 47/25* (2013.01); *H04L 47/30* (2013.01); *H04L 41/22* (2013.01)

(56) References Cited

U.S. PATENT DOCUMENTS

| | | | |
|---|---|---|---|
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,133 B1 | 4/2001 | Masthoff | |
| 6,216,135 B1 | 4/2001 | Brodersen et al. | |
| 6,233,617 B1 | 5/2001 | Rothwein et al. | |
| 6,236,978 B1 | 5/2001 | Tuzhilin | |
| 6,266,669 B1 | 7/2001 | Brodersen et al. | |
| 6,288,717 B1 | 9/2001 | Dunkle | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,411,949 B1 | 6/2002 | Schaffer | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec et al. | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,907,566 B1 | 6/2005 | McElfresh et al. | |
| 7,062,502 B1 | 6/2006 | Kesler | |
| 7,069,231 B1 | 6/2006 | Cinarkaya et al. | |
| 7,069,497 B1 | 6/2006 | Desai | |
| 7,100,111 B2 | 8/2006 | McElfresh et al. | |
| 7,181,758 B1 | 2/2007 | Chan | |
| 7,200,681 B1 * | 4/2007 | Lewin ................... | H04L 67/568 709/246 |
| 7,240,100 B1 * | 7/2007 | Wein ................... | H04L 67/1001 709/214 |
| 7,269,590 B2 | 9/2007 | Hull et al. | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,373,599 B2 | 5/2008 | McElfresh et al. | |
| 7,401,094 B1 | 7/2008 | Kesler | |
| 7,406,501 B2 | 7/2008 | Szeto et al. | |
| 7,412,455 B2 | 8/2008 | Dillon | |
| 7,454,509 B2 | 11/2008 | Boulter et al. | |
| 7,508,789 B2 | 3/2009 | Chan | |
| 7,599,935 B2 | 10/2009 | La Rotonda et al. | |
| 7,603,331 B2 | 10/2009 | Tuzhilin et al. | |
| 7,603,483 B2 | 10/2009 | Psounis et al. | |
| 7,620,655 B2 | 11/2009 | Larsson et al. | |
| 7,644,122 B2 | 1/2010 | Weyer et al. | |
| 7,668,861 B2 | 2/2010 | Steven | |
| 7,698,160 B2 | 4/2010 | Beaven et al. | |
| 7,730,478 B2 | 6/2010 | Weissman | |
| 7,734,815 B2 * | 6/2010 | Leighton ............. | H04L 43/0864 709/241 |
| 7,747,648 B1 | 6/2010 | Kraft et al. | |
| 7,752,258 B2 * | 7/2010 | Lewin ................ | G06F 16/9574 709/203 |
| 7,779,039 B2 | 8/2010 | Weissman et al. | |
| 7,779,475 B2 | 8/2010 | Jakobson et al. | |
| 7,827,208 B2 | 11/2010 | Bosworth et al. | |
| 7,853,881 B1 | 12/2010 | Aly Assal et al. | |
| 7,945,653 B2 | 5/2011 | Zukerberg et al. | |
| 8,005,896 B2 | 8/2011 | Cheah | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,073,850 B1 | 12/2011 | Hubbard et al. | |
| 8,082,301 B2 | 12/2011 | Ahlgren et al. | |
| 8,095,413 B1 | 1/2012 | Beaven | |
| 8,095,531 B2 | 1/2012 | Weissman et al. | |
| 8,095,594 B2 | 1/2012 | Beaven et al. | |
| 8,103,611 B2 | 1/2012 | Tuzhilin et al. | |
| 8,150,913 B2 | 4/2012 | Cheah | |
| 8,166,079 B2 * | 4/2012 | Lewin ................ | G06F 16/9574 709/203 |
| 8,209,308 B2 | 6/2012 | Rueben et al. | |
| 8,209,333 B2 | 6/2012 | Hubbard et al. | |
| 8,275,836 B2 | 9/2012 | Beaven et al. | |
| 8,423,662 B1 * | 4/2013 | Weihl .................. | H04L 65/1086 709/238 |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 9,667,747 B2 * | 5/2017 | Stevens ................ | H04L 67/01 |
| 9,942,363 B2 * | 4/2018 | Stevens ................ | H04L 63/08 |
| 11,128,732 B1 * | 9/2021 | Czerpak .............. | H04L 67/563 |
| 2001/0044791 A1 | 11/2001 | Richter et al. | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |

(56) References Cited

U.S. PATENT DOCUMENTS

| | | |
|---|---|---|
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0118653 A1 | 5/2007 | Bindal |
| 2007/0130313 A1* | 6/2007 | King ............... H04L 67/564 709/223 |
| 2007/0266426 A1* | 11/2007 | Iyengar ............ H04L 63/1458 726/5 |
| 2008/0243536 A1* | 10/2008 | Dworkin ............ H04L 67/1001 709/219 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0241760 A1* | 9/2010 | Zhang ................. H04L 43/16 709/235 |
| 2010/0274893 A1* | 10/2010 | Abdelal ............. H04L 47/263 709/224 |
| 2010/0293266 A1* | 11/2010 | Schilling ........... H04L 43/103 709/224 |
| 2011/0218958 A1 | 9/2011 | Warshavsky et al. |
| 2011/0247051 A1 | 10/2011 | Bulumulla et al. |
| 2011/0314145 A1* | 12/2011 | Raleigh ............... H04W 28/12 709/224 |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2012/0324091 A9* | 12/2012 | Raleigh ............... H04L 47/83 709/224 |
| 2013/0080635 A1* | 3/2013 | Ho ....................... H04L 67/60 709/225 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0232249 A1* | 9/2013 | Weihl ................ H04L 65/1086 709/223 |
| 2013/0247216 A1 | 9/2013 | Cinarkaya et al. |
| 2013/0301415 A1* | 11/2013 | Archer ............... H04L 41/0894 370/235 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0019913 A1* | 1/2015 | Singh ................ G06F 11/0709 714/37 |
| 2015/0088697 A1* | 3/2015 | Garnepudi ......... G06Q 30/0637 705/26.82 |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2015/0249579 A1* | 9/2015 | Ellsworth ........... H04L 67/125 709/221 |
| 2015/0304355 A1* | 10/2015 | Voit ..................... H04L 63/20 726/1 |
| 2016/0094611 A1* | 3/2016 | Chow .................. H04L 67/61 709/203 |
| 2016/0112275 A1* | 4/2016 | Park .................... H04L 41/147 709/224 |
| 2017/0078922 A1 | 3/2017 | Raleigh et al. |
| 2018/0260290 A1* | 9/2018 | Meaney .............. G06F 11/3006 |
| 2019/0182168 A1* | 6/2019 | Bastide ................ H04L 47/24 |
| 2020/0310509 A1* | 10/2020 | Gendler ............... G06F 1/3293 |
| 2021/0109785 A1* | 4/2021 | Prabhakaran ......... G06F 9/4887 |
| 2021/0144517 A1* | 5/2021 | Guim Bernat ........ H04L 9/3247 |
| 2021/0211347 A1* | 7/2021 | Vasseur ................ H04L 43/16 |
| 2021/0211490 A1* | 7/2021 | Zhang .................. H04L 67/101 |
| 2022/0394079 A1* | 12/2022 | Thomas ............... H04L 67/146 |
| 2023/0057068 A1 | 2/2023 | Bhandarkar et al. |
| 2023/0107052 A1* | 4/2023 | Brezner ................ G06F 16/958 719/314 |

FOREIGN PATENT DOCUMENTS

| | | |
|---|---|---|
| WO | WO-2010129275 A2 * | 11/2010 |
| WO | WO-2011149532 A1 * | 12/2011 |
| WO | WO-2012072690 A1 * | 6/2012 |
| WO | WO-2013170347 A1 * | 11/2013 |

\* cited by examiner

DYNAMIC TRAFFIC THROTTLING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing and more specifically relates to dynamic traffic throttling.

BACKGROUND

At certain times, traffic to a particular web site may exceed site capacity. Excess traffic (e.g., requests to access the web site) may cause a degradation in service. It may be useful to throttle traffic by reducing a number of site requests over a predetermined time period (e.g., site requests per minute). However, it can be difficult to dynamically react to changing traffic conditions by dynamically throttling traffic.

The subject matter discussed in the background section should not be assumed to be prior art merely as a result of its mention in the background section. Similarly, a problem mentioned in the background section or associated with the subject matter of the background section should not be assumed to have been previously recognized in the prior art.

BRIEF DESCRIPTION OF THE DRAWINGS

The included drawings are for illustrative purposes and serve only to provide examples of possible structures and process operations for the disclosed techniques. These drawings in no way limit any changes in form and detail that may be made to implementations by one skilled in the art without departing from the spirit and scope of the disclosure.

DETAILED DESCRIPTION

Figure 1:
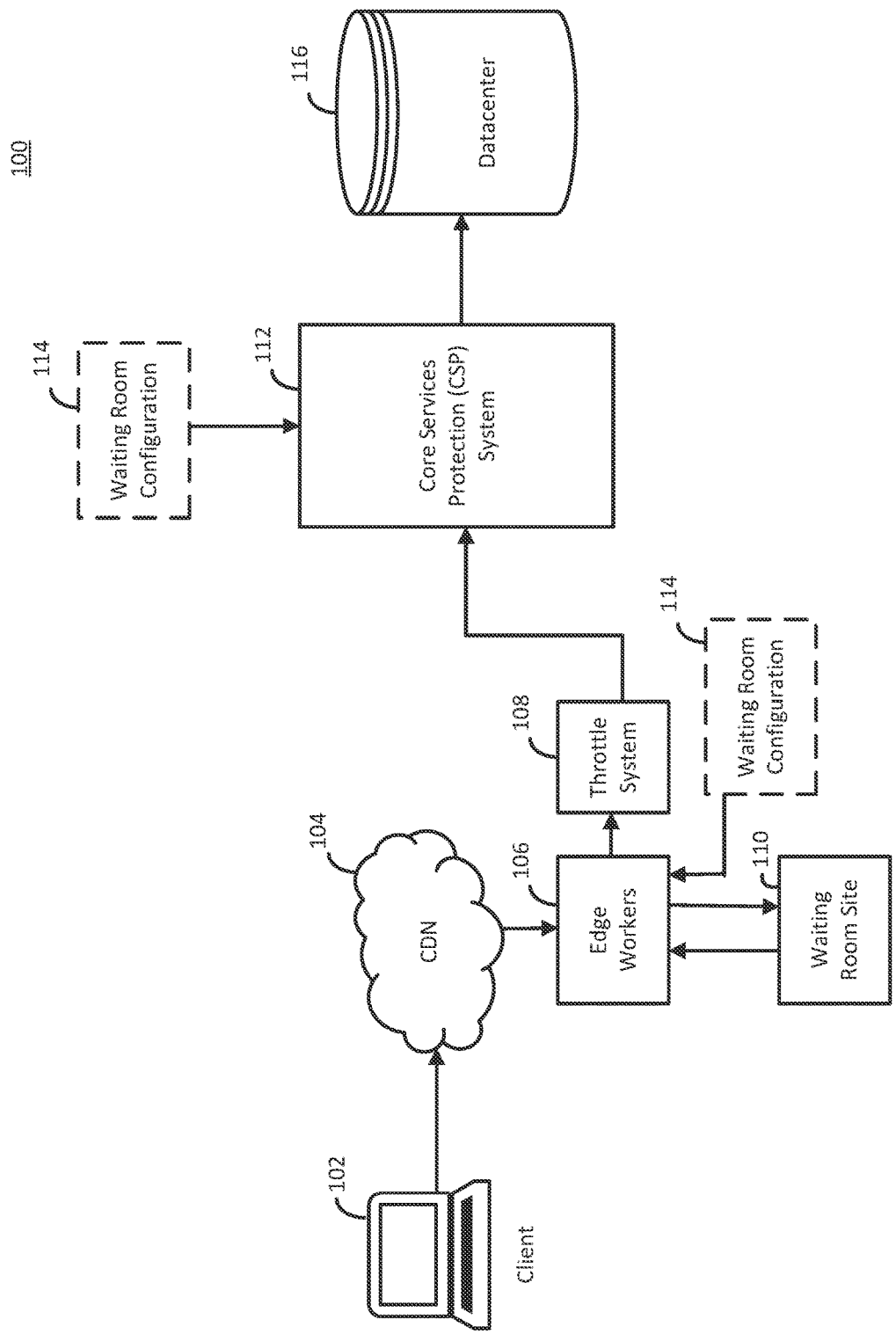
FIG. 1 shows an example system for dynamic traffic throttling in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used, and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer-readable media provide network security orchestration and management across different cloud providers to facilitate transitioning of enterprise infrastructure to public clouds. For instance, a multi-cloud infrastructure can be implemented on popular public cloud platforms including Amazon Web Services (AWS), Google Cloud Platform (GCP), Microsoft Azure and Alibaba Cloud. Customer data can be protected in the various public clouds of the multi-cloud infrastructure. Some implementations of disclosed network security techniques and frameworks provide fundamental security measures to protect customer data from unauthorized access. For instance, some security measures require that only entities (internal or external with respect to a network) with proper permissions and authorizations can access certain resources in the network.

In some implementations, traffic to a site associated with a datacenter (e.g., a datacenter of a multi-tenant system) is throttled. In some implementations, during time periods when traffic is being throttled, requests from client devices to access the site are received by edge workers of a content delivery network (CDN) and at least a portion or subset of the client devices are directed to a waiting room site. The waiting room site may be associated with the site the client devices are requesting to access. For example, the waiting room site may have been configured by an entity associated with the site, may include a logo of the site, etc. In some implementations, client devices that have been directed to the waiting room site may be queued and may subsequently be directed to the requested site based on the queue (e.g., in an order specified by the queue). In some implementations, client devices may be directed from the waiting room site to the requested site based on a throttling rate.

In some implementations, a server associated with a core services protection (CSP) system may determine whether to begin throttling traffic. For example, the CSP server may determine that traffic is to be throttled based on a status of a datacenter. As a more particular example, the status of the datacenter may indicate a degradation in datacenter performance. In one example, degradation may be based on an identification of a spike in CPU usage of processors of the datacenter. Other examples of degradation metrics may include a spike in CPU usage of processors of an application server, a usage of connections to the datacenter, and/or network usage information (e.g., network bandwidth, latency, or the like). In some implementations, responsive to determining that traffic throttling is to be initiated, the CSP server may determine a throttling rate. In some implementations the throttling rate may be determined based at least in part on traffic during a time period prior to and/or overlapping with the detection of degradation in datacenter performance. For example, in some implementations, the CSP server may set a throttling rate that is below the number of requests per minute at the time of the detected degradation. As another example, in some implementations, the CSP server may set a throttling rate that is at or close to the number of requests per minute during a time period just prior to the detected degradation. In some implementations, the CSP server may identify a particular site for which traffic is to be throttled. For example, in an instance in which traffic to a particular site has spiked, the CSP server can determine that traffic to that site is to be throttled. By throttling traffic to specific sites that may be causing degradation of datacenter performance, impact to other sites associated with the datacenter may be mitigated.

In some implementations, the CSP server may enable a waiting room site. The waiting room site may be enabled with an indication of the throttling rate. By enabling the waiting room site, the CSP server can instruct edge workers associated with the CDN to utilize the waiting room site and effectively throttle traffic subject to the throttling rate. In some implementations, the CSP server may dynamically modify the throttling conditions based on an impact of the traffic throttling on datacenter performance. For example, the CSP server may determine that throttling traffic has sufficiently improved datacenter performance and can accordingly disable the waiting room site, thereby ending the throttling. As another example, the CSP server may determine that throttling traffic has improved datacenter performance and can increase the throttling rate, thereby allowing an increase in traffic to the requested site. As yet another example, the CSP server may determine that throttling traffic has not improved datacenter performance and may further decrease the throttling rate. By dynamically modifying throttling conditions responsive to datacenter performance, the CSP server can effectively balance the needs of different sites associated with the datacenter while also protecting sites experiencing a relatively high volume of traffic. Moreover, by utilizing edge workers to throttle traffic (by directing client devices to a waiting room site for a period of time), the CSP server can direct throttling while causing the actual implementation to occur downstream from the datacenter and closer to the client devices. This allows for more flexible throttling that is responsive to changing datacenter conditions.

It should be noted that, in some implementations, there may be multiple waiting room sites concurrently enabled, where the multiple waiting room sites are associated with different sites to which access has been requested. In some implementations, the different sites may be hosted by the same datacenter, by different datacenters, or any suitable combination. Additionally or alternatively, in some implementations, there may multiple waiting room sites concurrently enabled, where the multiple waiting room sites are associated with the same site for which access has been requested. For example, different waiting room sites may be associated with the same main site but different endpoints or resources associated with the main site.

It should be noted that the techniques described herein may be utilized under a variety of conditions or circumstances. For example, the techniques described herein may be utilized during particular time periods in which a site may experience an increase in site traffic, such as for an ecommerce site during a sales period, etc. As another example, the techniques described herein may be utilized during a distributed denial of service (DDOS) attack in which a site that is being attacked is receiving an excessive number of requests. Continuing with this example, rather than passing the requests to the site, traffic may be intercepted by edge workers and redirected to the waiting room site, thereby preventing the entire datacenter from going down. Moreover, other sites hosted by the datacenter in a multi-tenant system may be protected from one site experiencing a DDOS attack.

FIG. 1 shows an example of a system 100 for dynamic traffic throttling in accordance with some implementations. As illustrated, a client device 102 requests access to a site associated with a datacenter 116. Datacenter 116 may be associated with multiple sites in addition to the requested site. For example, datacenter 116 may be associated with a multi-tenant system.

In some implementations, the request to access the first site is received by a CDN 104. The CDN 104 may be associated with multiple edge workers, such as an edge worker 106. An edge worker may be a server that is located relatively downstream (i.e., closer to client device 102) from datacenter 116. In some implementations, edge worker 106 may determine whether a waiting room has previously been enabled in connection with the requested site. In other words, edge worker 106 may determine whether throttling conditions have previously been initiated for the requested site. If so, edge worker 106 may direct client device 102 to a waiting room site 110. The edge worker may after a period of time and subject to a previously determined throttling rate, allow client device 102 to access the requested site. It should be noted that multiple client devices may be accessing waiting room site 110 concurrently with client device 102. In some implementations, edge worker 106 may be implemented as and/or include one or more databases, such as Edge KV. Such a database may store information, such as whether throttling has been initiated for a particular site, a current throttling rate for the particular site, a waiting room configuration associated with a waiting room client devices are to be directed to during throttling conditions, or the like.

In some implementations, edge worker 106 may utilize a throttle system 108 to identify and/or enforce throttling rates determined by CSP system 112. For example, in some implementations, edge worker 106 may determine whether or not a waiting room has been enabled for a particular site using throttle system 108. As a more particular example, edge worker 106 may use throttle system 108 to receive a message from CSP system 112 that indicates that throttling is to occur and, if throttling is to occur, a throttling rate and/or a waiting room configuration associated with a waiting room client devices are to be directed to. In some implementations, throttle system 108 may include an API gateway.

In some implementations, CSP system 112 may include one or more servers in communication with datacenter 116. In some implementations, CSP system 112 and CDN 104 are operated by different entities. In some implementations, CSP system 112 may determine whether or not to initiate traffic throttling based on a status of datacenter 116, as shown in and described below in connection with FIGS. 3 and 4. In some implementations, responsive to a determination that traffic throttling is to be initiated, CSP system 112 may enable a waiting room site, thereby causing traffic intercepted by CDN 104 to be directed to the waiting room site. In some implementations, the waiting room site may be preconfigured prior to any determination of whether traffic throttling is to occur. For example, in some implementations, the waiting room site may be designed and/or configured using an application associated with CSP system 112 and stored for later use. As a more particular example, a waiting room configuration 114 may be received and/or stored by CSP system 112. In some implementations, waiting room configuration 114 may be received by CSP system 112 and subsequently passed or transmitted to a database associated with edge workers 106. As another example, in some implementations, waiting room configuration 114 may be received and stored by edge workers 106. In such implementations, waiting room configuration 114 may also be utilized by edge workers 106.

Figure 2:
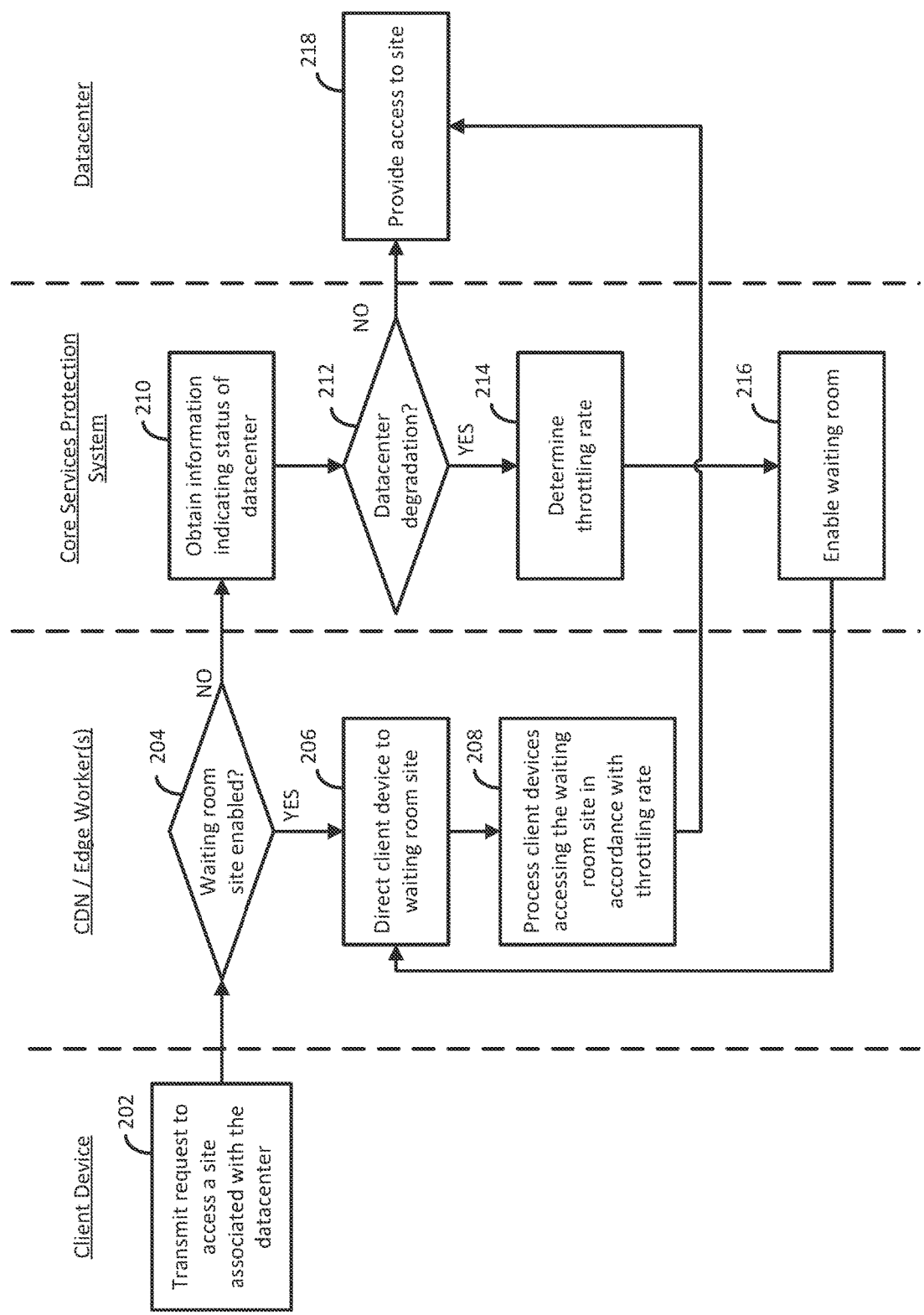
FIG. 2 shows an example information flow diagram for dynamic traffic throttling in accordance with some implementations.

Turning to FIG. 2, an example of an information flow diagram for traffic throttling is shown in accordance with some implementations. As illustrated, blocks of the information flow diagram are executed by a client device, a CDN/edge worker(s), a CSP system, and a datacenter.

At 202, a client device may transmit a request to access a site associated with the datacenter. In some implementations, the client device may be any suitable user device, such as a desktop computer, a laptop computer, a mobile phone, a tablet computer, a wearable computer, or the like. The site may be one of multiple sites associated with the datacenter, for example, as part of a multi-tenant system.

At 204, the CDN/edge worker(s) receive the request to access the site and determine whether a waiting room associated with the site has previously been enabled. In other words, the CDN/edge worker(s) determine if throttling conditions have previously been initiated in connection with the requested site. In some implementations, the CDN/edge worker(s) determine whether a waiting room has previously been enabled by determining whether a message has previously been received indicating that throttling has been initiated (e.g., a message received from the CSP system).

If, at 204, the CDN/edge worker(s) determine that a waiting room site has previously been enabled ("yes" at 204), the CDN/edge worker(s) proceed to 206 and direct the client device to the waiting room site. The waiting room site may have been preconfigured (e.g., by an entity associated with the requested site) and may include any suitable content. Examples of content that may be included in the waiting room site include a logo associated with the requested site, an estimated amount of time until the client device is directed to the requested site, any suitable graphics, animations, icons, etc., or the like.

It should be noted that, if a waiting room site has previously been enabled, the CDN/edge worker(s) may additionally determine a throttling rate that specifies a rate at which client devices are permitted to access the requested site. The throttling rate may have been determined by the CSP system, as will be discussed below in connection with blocks 210-216.

At 208, the CDN/edge worker(s) may process client devices accessing the waiting room site in accordance with the throttling rate. For example, the CDN/edge worker(s) may maintain a queue of client devices that have been directed to the waiting room site and may direct client devices from the queue to the requested site at a rate substantially corresponding to the throttling rate. As a more particular example, in an instance in which the throttling rate is 100 requests per minute, the CDN/edge worker(s) may direct 100 client devices per minute from the waiting room site to the requested site, where the datacenter may provide access to the requested site at 218.

It should be noted that, in some implementations, a queue associated with the waiting room site may be prioritized based on various criteria such that a client device that requests the site and is directed to the waiting room site is not necessarily placed at the end of the queue. Rather, the client device may be placed further ahead in the queue based on various prioritization criteria. Examples of prioritization criteria may include a client device being authenticated to a certain tier of membership associated with the requested site, or the like. In some implementations, prioritization may be verified by the client device possessing a particular access cookie.

Conversely, if at 204, the CDN/edge worker(s) determine that the waiting room site has not been enabled ("no" at 204), the CSP system can obtain, at 210, information indicating status of the datacenter. The information may indicate present and/or recent CPU usage by processors of the datacenter, present and/or recent CPU usage by processors of the CSP system, network information associated with the datacenter (e.g., a present or recent bandwidth, a present or recent latency, etc.), datacenter connection usage, or the like.

At 212, the CSP system can determine whether there is datacenter performance degradation based at least in part on the obtained information. For example, in some implementations, the CSP system can determine that there is datacenter performance degradation in response to determining that one or more metrics (e.g., CPU usage) exceed a predetermined threshold. As another example, in some implementations, the CSP system can determine that there is datacenter performance degradation in response to determining that one or more metrics (e.g., bandwidth, latency, etc.) are below a predetermined threshold.

If, at 212, the CSP system determines that there is no datacenter performance degradation ("no" at 212), the CSP system can permit the client device to access the requested site at 218.

Conversely, if, at 212, the CSP system determines that there is datacenter performance degradation ("yes" at 212), the CSP system can determine a throttling rate at 214. In some implementations, the throttling rate may be determined based on present or recent traffic to one or more sites associated with the datacenter, as shown in and described below in more detail in connection with FIGS. 3 and 4. In some implementations, the throttling rate may be determined based on a pre-identified (e.g., predetermined) rate at which degradation has been identified as likely to occur (e.g., based on previous or historical instances of degradation). For example, in some implementations, the throttling rate may be set to a rate below a rate at which degradation has been identified as likely to occur. By setting the throttling rate based on a pre-identified degradation rate at which degradation is likely to occur, degradation may be avoided by throttling access to sites at a rate below that at which degradation is likely to occur.

At 216, the CSP system can enable the waiting room site. In some implementations, the CSP system can cause the waiting room site to be enabled by transmitting a message to the edge worker(s) that throttling is to occur in connection with the particular site. In some implementations the message may be transmitted by utilizing an API. In some implementations, the message may additionally indicate the throttling rate, for example, as payload associated with the message.

Responsive to the waiting room site being enabled, the CDN/edge worker(s) can direct the client device to the waiting room site at 206.

In some implementations, a CSP system determines whether to throttle traffic to a particular site based on traffic to the first site associated with a datacenter and/or traffic to other sites associated with the datacenter. For example, in some implementations, the CSP system may determine that traffic to a site is to be throttled in response to determining that datacenter performance has degraded beyond an acceptable level. In some implementations, the CSP system may identify a site to be throttled based on an identification of the site as likely to be causing the degradation in performance. In some implementations, the CSP system may determine a throttling rate that controls an access rate (e.g., accesses per minute) of the site to be throttled. The throttling rate may be determined based at least in part on traffic to the site prior to and/or coincident with the degradation in performance. In some implementations, the CSP system may then transmit instructions to an edge worker that cause the edge worker to then redirect client devices to a waiting room site prior to accessing the site being throttled in accordance with the throttling rate. For example, in some implementations, the CSP system may cause a waiting room site to be enabled, which thereby causes the edge worker to direct client devices to the waiting room site rather to the requested site being throttled.

Figure 3:
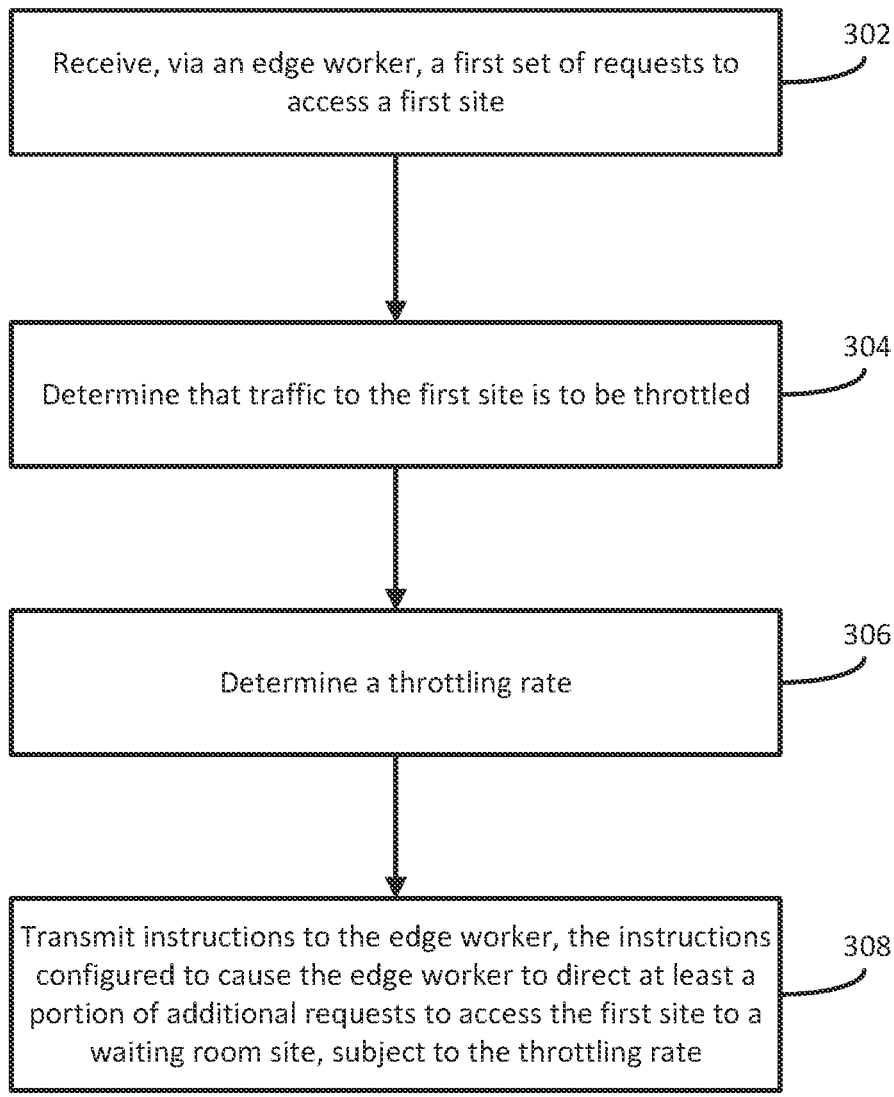
FIG. 3 shows an example of a process for throttling traffic in accordance with some implementations.

FIG. 3 shows a flowchart of an example process 300 for throttling traffic via an edge worker in accordance with some implementations. In some implementations, blocks of process 300 may be executed on one or more servers, such as servers associated with a CSP system. In some implementations, two or more blocks of process 300 may be executed substantially in parallel. In some implementations, one or more blocks of process 300 may omitted.

At 302, process 300 can receive, via an edge worker (or multiple edge workers), a first set of requests to access a first site. The first set of requests may be from multiple client devices (e.g., two, five, ten, one hundred, one thousand, or the like) or from a single device. The first set of requests may include any suitable number of requests (e.g., one, ten, fifty, one hundred, one thousand, etc.) received over any suitable time period. The first site may be one that is associated with a datacenter associated with the CSP system. The datacenter may also be associated with sites other than the first site, for example, as part of a multi-tenant system. In some implementations, the edge worker may be a server that is located relatively downstream to the client devices requesting access to the first site. The edge worker may be communicatively coupled to the CSP system, for example, communicating via an API Gateway, as shown in and described above in connection with FIG. 1.

At 304, process 300 can determine that traffic to the first site is to be throttled. For example, in some implementations, process 300 can determine that traffic to the first site is to be throttled responsive to determining that performance of the datacenter has degraded beyond an acceptable level. Degradation may be measured by CPU usage, network performance (e.g., bandwidth, latency, etc.), or the like. In some implementations, process 300 may identify degradation of datacenter performance, and may subsequently identify the first site as the site to which traffic is to be throttled. For example, process 300 may identify a first site that is experiencing more than a predetermined threshold of CPU usage associated with the datacenter (e.g., more than 50% CPU usage, more than 60% CPU usage, etc.). As another example, in some implementations, process 300 may identify the first site out of a set of sites associated with the datacenter based on factors such as the first site experiencing a spike in traffic over a period of time (e.g., over the previous minute, over the previous five minutes, over the previous ten minutes, etc.), the first site experiencing relatively higher traffic than the other sites (e.g., 50% more traffic, 100% more traffic, etc.), the first site utilizing a higher percentage of network bandwidth than other sites, or the like. In some implementations, process 300 may identify the first site based on a combination of factors, such as datacenter CPU usage, application server usage, network usage, or the like.

At 306, process 300 can determine a throttling rate. The throttling rate may be an upper limit of accesses of the first site over a period of time, such as 100 accesses per minute, 200 accesses per minute, or the like. In some implementations, process 300 may determine the throttling rate based at least in part on traffic to the first site during a time period just preceding and/or coincident with degradation in performance of the datacenter. For example, in some implementations, process 300 can determine the throttling rate based at least in part on a number of requests in the first set of requests, which may be indicative of traffic to the first site during the time period just preceding and/or coincident with degradation in performance of the datacenter. In some implementations, the throttling rate can be a value that is lower than the traffic just prior to and/or coincident with the identification of degradation in performance of the datacenter. By way of example, in an instance in which there were 100 requests in the first set of requests, and in which the first set of requests spanned a minute, process 300 can set the throttling rate as a value lower than 100 requests per minute (e.g., 80 requests per minute, 50 requests per minute, 30 requests per minute, etc.). In some implementations, the value of the throttling rate may be determined based on a combination of the number of requests in the first set of requests and a degree of degradation of datacenter performance. For example, in some implementations, the throttling rate may be a decrease relative to the traffic represented in the first set of requests that is decreased in proportion to the degree of degradation. As a more particular example, in instances of more severe degradation in performance, the throttling rate may be set at a value that is substantially lower than the traffic represented in the first set of requests relative to an instance in which the degradation is less severe. In some implementations, the throttling rate may be determined based on a pre-identified (e.g., predetermined) rate at which degradation has been identified as likely to occur (e.g., based on previous or historical instances of degradation). In some implementations, the throttling rate may be determined based on a combination of requests to access the first site over a recent period of time and a pre-identified rate at which degradation has been identified as likely to occur.

At 308, process 300 can transmit instructions to the edge worker, the instructions configured to cause the edge worker to direct at least a portion of additionally received requests to access the first site to a waiting room site. The instructions may cause the edge worker to direct client devices that have requested access to the first site to the waiting room site subject to, or in accordance with, the throttling rate. In some implementations, the additional requests may be received by the same or by different client devices as those associated with the first set of requests. In some implementations, at least a portion of client devices associated with the additional requests are directed to the waiting room site prior to being granted access to the requested first site. In some implementations, the client devices are queued, and are granted access to the first site based on an order of the queue, as shown in and described above in connection with block 208 of FIG. 2.

In some implementations, transmitting the instructions may involve causing a waiting room site associated with the first site to be enabled. The instructions to enable the waiting room may further include an indication of the throttling rate determined at block 306. More detailed techniques for enabling the waiting room site are described below in connection with block 412 of FIG. 4. In some implementations, the edge worker may then receive an indication that the waiting room site has been enabled, and the edge worker may further identify the present throttling rate associated with the first site.

In some implementations, a CSP system may dynamically adjust throttling conditions based on datacenter performance. For example, in some implementations, the CSP system may initiate throttling of a first site at a first throttling rate responsive to detecting or identifying a degradation in performance of the datacenter. Continuing with this example, the CSP system may obtain updated information regarding performance of the datacenter to determine an effect of the throttling at the first throttling rate. Continuing further with this example, the CSP system may then modify the throttling conditions responsive to the updated information regarding performance of the datacenter. For example, responsive to determining that performance of the datacenter has improved due to throttling at the first throttling rate, the CSP system may disable throttling or modify the first throttling rate to a second, higher throttling rate, thereby allowing increased access to the first site. Conversely, responsive to determining that performance of the datacenter has not improved due to throttling at the first throttling rate, the CSP system may modify the first throttling rate to a second, lower throttling rate, thereby further decreasing traffic to the first site.

Figure 4:
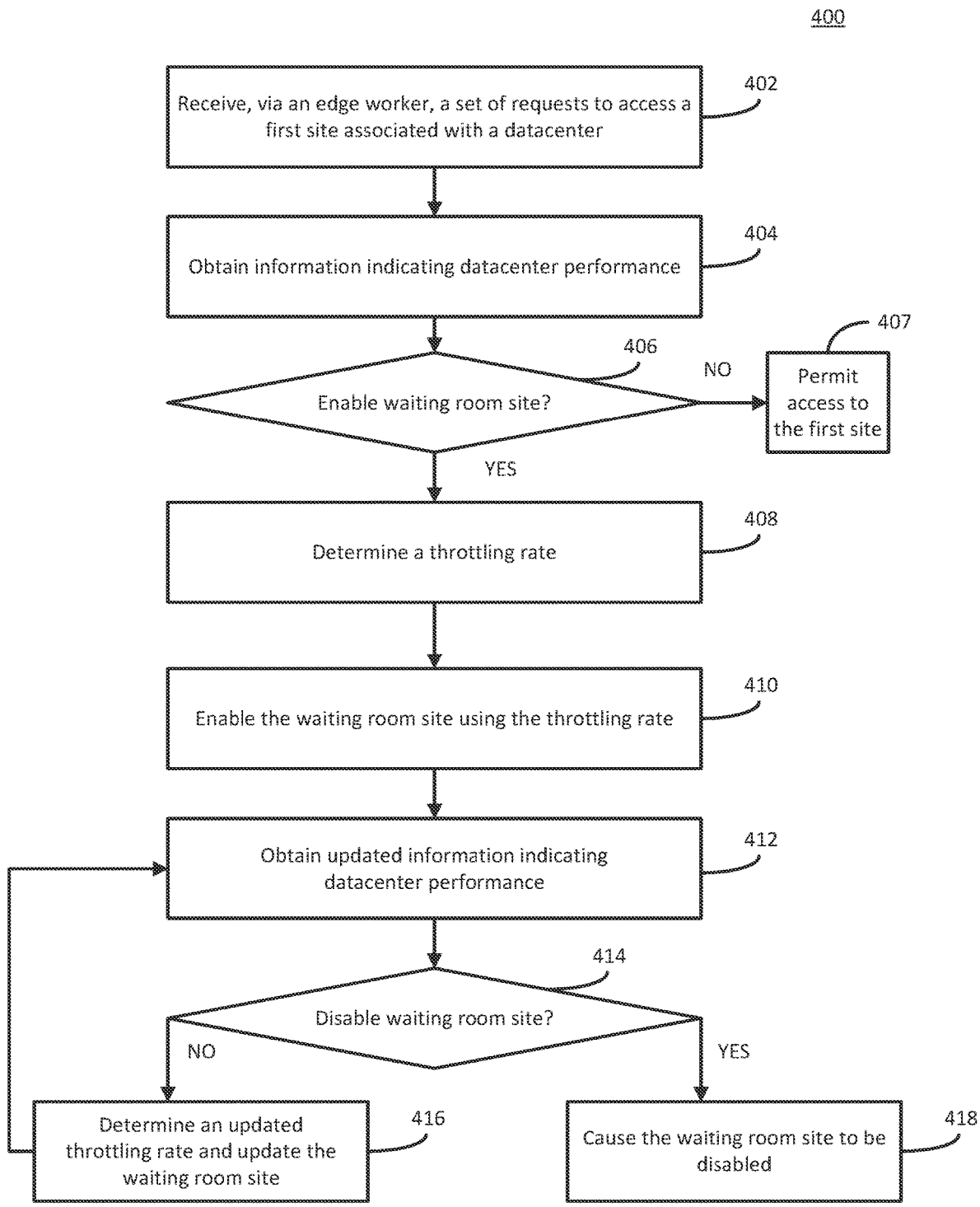
FIG. 4 shows an example of a process for dynamic throttling adjustments in accordance with some implementations.

FIG. 4 shows a flowchart of an example process 400 for dynamic throttling adjustments in accordance with some implementations. In some implementations, blocks of process 400 may be executed by one or more servers, such as servers of a CSP system. In some implementations, two or more blocks of process 400 may be executed substantially in parallel. In some implementations, one or more blocks of process 400 may omitted.

Process 400 can begin at 402 by receiving, via an edge worker, a set of requests to access a first site associated with a datacenter. The set of requests may be from multiple client devices (e.g., two, five, ten, one hundred, one thousand, or the like) or from a single device. The set of requests may include any suitable number of requests (e.g., one, ten, fifty, one hundred, one thousand, etc.) received over any suitable time period. The first site may be one that is associated with a datacenter associated with the CSP system. The datacenter may also be associated with sites other than the first site, for example, as part of a multi-tenant system. In some implementations, the edge worker may be a server that is located relatively downstream to the client devices requesting access to the first site. The edge worker may be communicatively coupled to the CSP system, for example, communicating via an API Gateway, as shown in and described above in connection with FIG. 1.

At 404, process 400 can obtain information indicating datacenter performance. Datacenter performance may include any suitable metrics or combination of metrics, such as CPU usage of one or more processors associated with the datacenter, network information (e.g., network bandwidth, network latency, etc.), or the like. The obtained information may coincide with a time period over which the set of requests was received, thereby indicating the datacenter performance at least partially due to responding to the set of requests.

At 406, process 400 can determine whether a waiting room site is to be enabled. For example, process 400 can determine whether throttling is to be performed in connection with access to the first site, and, responsive to determining that throttling is to be performed, can determine that the waiting room site is to be enabled. Conversely, process 400 can determine that the waiting room site is not to be enabled responsive to determining that throttling is not to be performed. Process 400 can determine whether or not throttling is to be performed based on the information indicating datacenter performance, for example, by determining whether the information indicates an unacceptable level of degradation of datacenter performance, as described above in connection with block 304 of FIG. 3.

If, at 406, process 400 determines that the waiting room site is not to be enabled ("no" at 406), process 400 can proceed to block 407 and can permit access to the first site unencumbered (e.g., without any throttling).

Conversely, if, at 406, process 400 determines that the waiting room site is to be enabled ("yes" at 406), process 400 can proceed to block 408 and can determine a throttling rate. In some implementations, process 400 can determine the throttling rate based at least in part on the set of requests received at block 402. For example, a number of requests in the set of requests may indicate traffic to the first site at a time a degradation in datacenter performance occurred, and process 400 can accordingly determine a throttling rate based on the traffic at which the degradation occurred. As a more particular example, in an instance in which the set of requests spanned a particular time period just prior to and/or coincident with the detection of the degradation in datacenter performance, process 400 can set the throttling rate as a rate of access lower than the rate of requests corresponding to the set of requests. By way of example, in an instance in which the set of requests includes 100 requests over a minute, process 400 can set the throttling rate to a rate lower than 100 requests per minute (e.g., 80 requests per minute, 70 requests per minute, 50 requests per minute, etc.). In some implementations, the throttling rate may be determined based on a pre-identified (e.g., predetermined) rate at which degradation has been identified as likely to occur (e.g., based on previous or historical instances of degradation). In some implementations, the throttling rate may be determined based on a combination of requests to access the first site over a recent period of time and a pre-identified rate at which degradation has been identified as likely to occur.

At 410, process 400 can enable the waiting room site using the throttling rate. For example, in some implementations, process 400 can transmit an instruction that causes the waiting room site to be activated or enabled, where a portion of the instruction indicates the throttling rate. An example of such an instruction which may utilize the Edge KV API is:

PUT edgekv/v1/networks/{network}/namespaces/{namespace-id}/groups/{group-id}/items/{item-id},
where the payload of the instruction may indicate the throttling rate, such as "{rate-limit:10}", indicating a throttling rate of 10 requests per minute.

With respect to the above instruction, the network, namespace, group, and item may uniquely specify a site within an item, group, namespace, account hierarchy.

As described above in connection with FIG. 1, the waiting room site may have been pre-configured and provided to the CSP system prior to execution of process 400. For example, the waiting room site may have been pre-configured by an entity associated with the first site.

It should be noted that enablement of the waiting room site may cause one or more edge workers to begin throttling traffic to the first site subject to the throttling rate. For example, the one or more edge workers may begin directing client devices to the enabled waiting room site prior to granting access to the first site, as shown in and described above in connection with FIG. 2.

At 412, process 400 can obtain updated information indicating datacenter performance. For example, the updated information may indicate a change in datacenter performance as a result of the throttling. The updated information may include any metrics or combination of metrics, such as an updated CPU usage, updated network performance information (e.g., bandwidth, latency, etc.), or the like.

At 414, process 400 can determine whether the waiting room site is to be disabled. For example process 400 can determine whether the updated information obtained at block 412 indicates that the datacenter performance has improved to a degree such that throttling traffic to the first site is no longer needed, and therefore, the waiting room site can be disabled. As another example, process 400 can determine that the updated information obtained at block 412 indicates that the datacenter performance has improved, but not to a degree that throttling traffic to the first site is no longer needed, and therefore, that the waiting room site is to remain enabled. As yet another example, process 400 can determine that the updated information obtained at block 412 indicates that the datacenter performance has not improved, and therefore, that the waiting room site is to remain enabled.

If, at 414, process 400 determines that the waiting room site is not to be disabled ("no" at 414), process 400 can proceed to block 416 and can determine an updated throttling rate and can update the information associated with the waiting room site. For example, in an instance in which datacenter performance has improved, process 400 can determine an updated throttling rate that is higher than the throttling rate determined at block 408. As another example, in an instance in which datacenter performance has not improved, process 400 can determine an updated throttling rate that is lower than the throttling rate determined at block 408. It should be noted that, in some implementations, the throttling rate may remain the same. In some implementations, the degree to which the throttling rate is changed may be based at least in part on a degree of change in datacenter performance. For example, larger improvements in datacenter performance may lead to an updated throttling rate that is substantially lower, i.e., closer to no throttling.

Process 400 may update the throttling rate associated with the waiting room site by transmitting an instruction that indicates the updated throttling rate. For example, process 400 may transmit another PUT message with a payload that indicates the updated throttling rate.

Conversely, if, at 414, process 400 determines that the waiting room site is to be disabled ("yes" at 414), process 400 can transmit an instruction that causes the waiting room site to be disabled or deactivated at 418. It should be noted that disabling or deactivating a waiting room site may not delete the waiting room site, but may merely cause edge workers to no longer direct client devices to the waiting room site. Effectively, disabling the waiting room site may cause throttling to the first site to no longer occur.

An example of an instruction to disable a waiting room site using the Edge KV API is:
DELETE/edgekv/v1/networks/{network}/namespaces/ {namespace-id}/groups/{group-id}/items/{item-id}

It should be noted that process 400 can loop through the blocks of process 400 any suitable number of times. For example, process 400 can loop through the blocks of process 400 indefinitely and/or continuously.

Figure 5A:
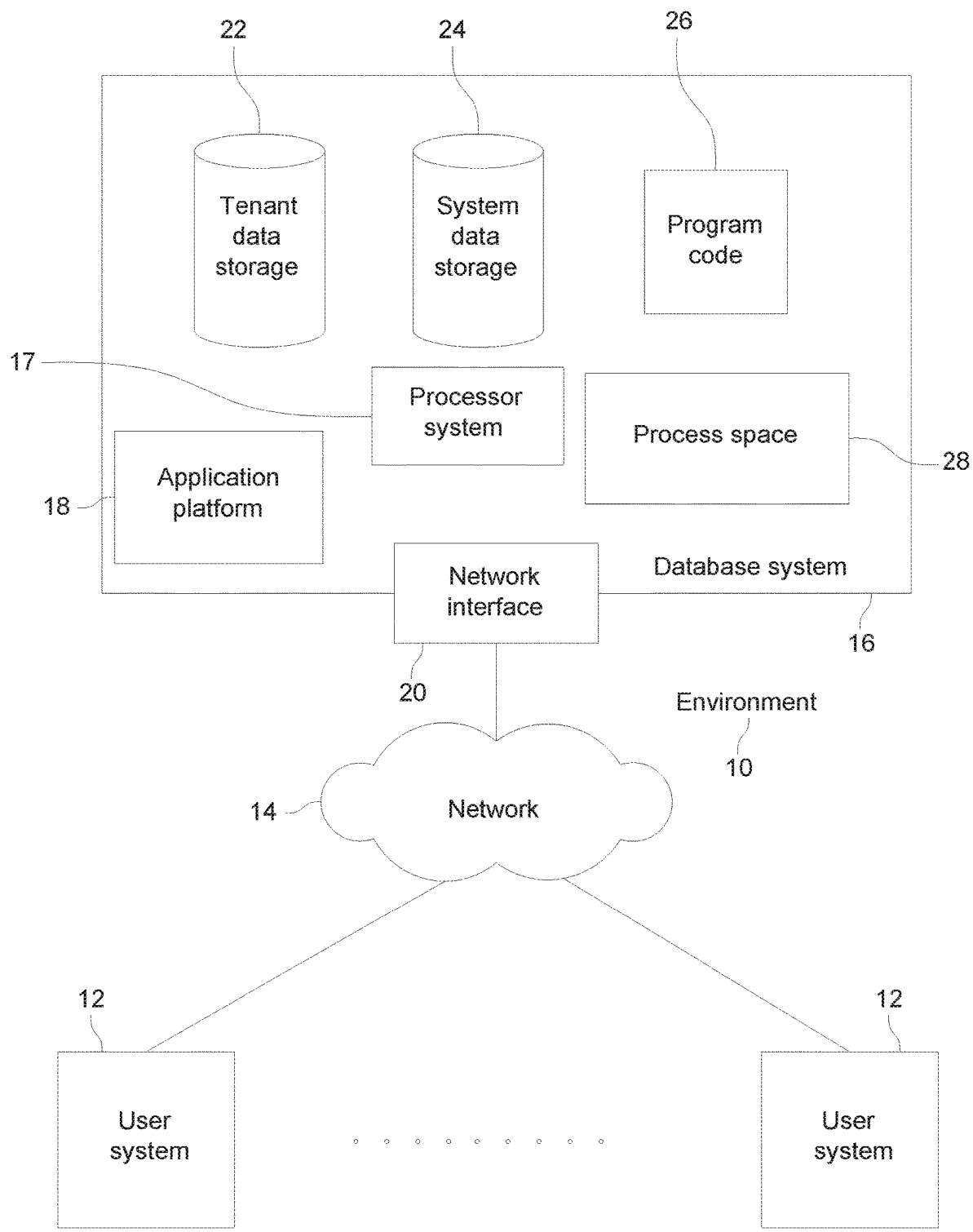
FIG. 5A shows a block diagram of an example of an environment 10 in which an on-demand database service can be used in accordance with some implementations.

FIG. 5A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a workstation and/or a network of computing devices. As illustrated in FIG. 5A (and in more detail in FIG. 5B) user systems 12 might interact via a network 14 with an on-demand database service, which is implemented in the example of FIG. 5A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 5A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 5B:
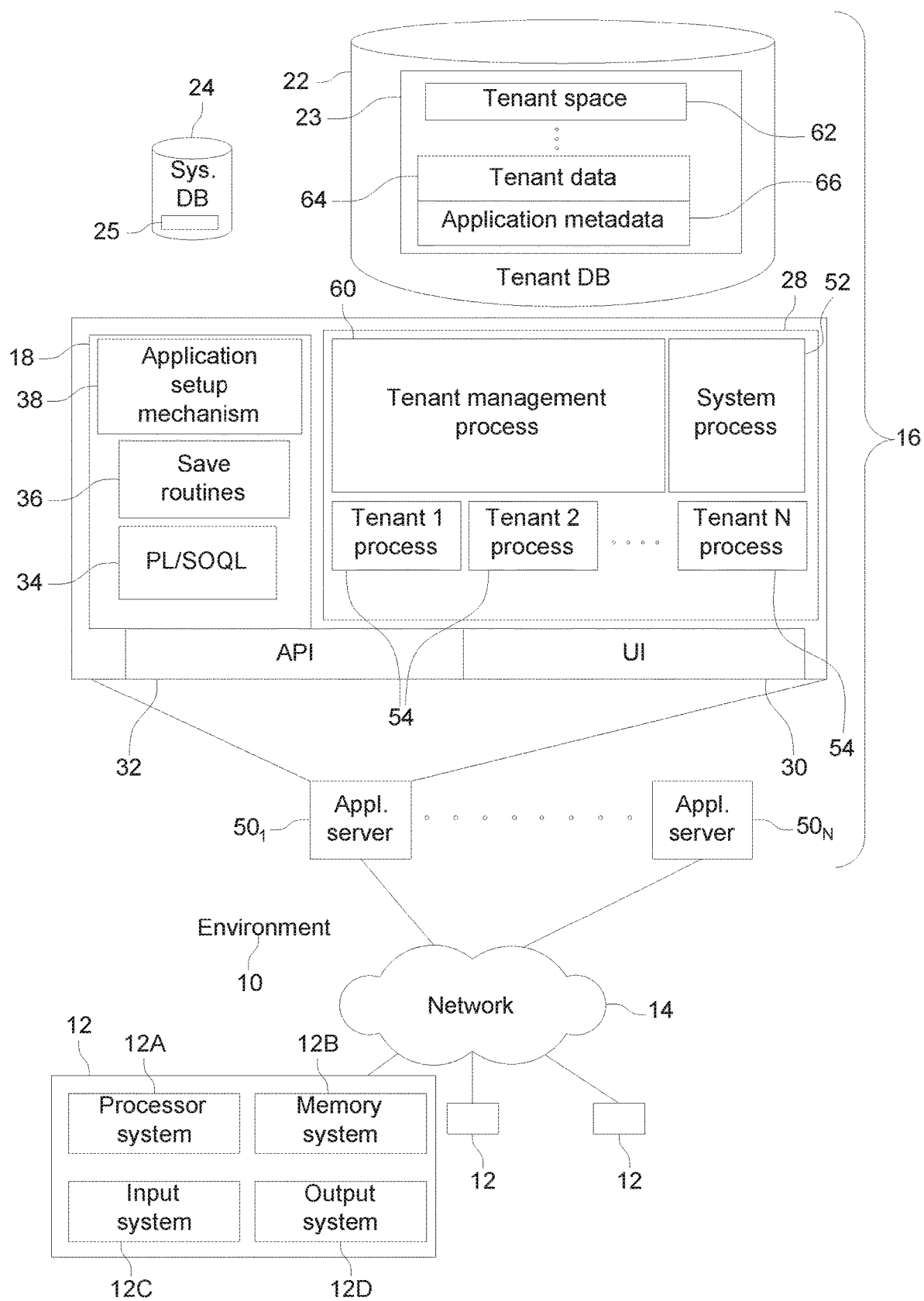
FIG. 5B shows a block diagram of an example of some implementations of elements of FIG. 5A and various possible interconnections between these elements.

One arrangement for elements of system 16 is shown in FIGS. 5A and 5B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 5A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 5B shows a block diagram of an example of some implementations of elements of FIG. 5A and various possible interconnections between these elements. That is, FIG. 5B also illustrates environment 10. However, in FIG. 5B elements of system 16 and various interconnections in some implementations are further illustrated. FIG. 5B shows that user system 12 may include processor system 12A, memory system 12B, input system 12C, and output system 12D. FIG. 5B shows network 14 and system 16. FIG. 5B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 5A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 5B, system 16 may include a network interface 20 (of FIG. 5A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 6A:
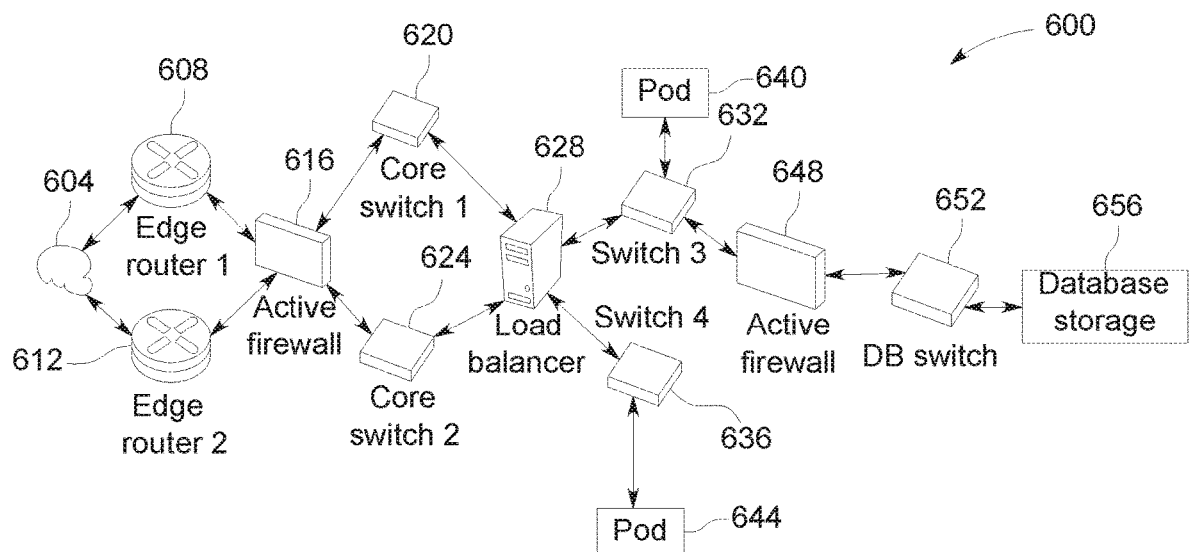
FIG. 6A shows a system diagram of an example of architectural components of an on-demand database service environment 900, in accordance with some implementations.

FIG. 6A shows a system diagram of an example of architectural components of an on-demand database service environment 600, in accordance with some implementations. A client machine located in the cloud 604, generally referring to one or more networks in combination, as described herein, may communicate with the on-demand database service environment via one or more edge routers 608 and 612. A client machine can be any of the examples of user systems 12 described above. The edge routers may communicate with one or more core switches 620 and 624 via firewall 616. The core switches may communicate with a load balancer 628, which may distribute server load over different pods, such as the pods 640 and 644. The pods 640 and 644, which may each include one or more servers and/or other computing resources, may perform data processing and other operations used to provide on-demand services. Communication with the pods may be conducted via pod switches 632 and 636. Components of the on-demand database service environment may communicate with a database storage 656 via a database firewall 648 and a database switch 652.

Figure 6B:
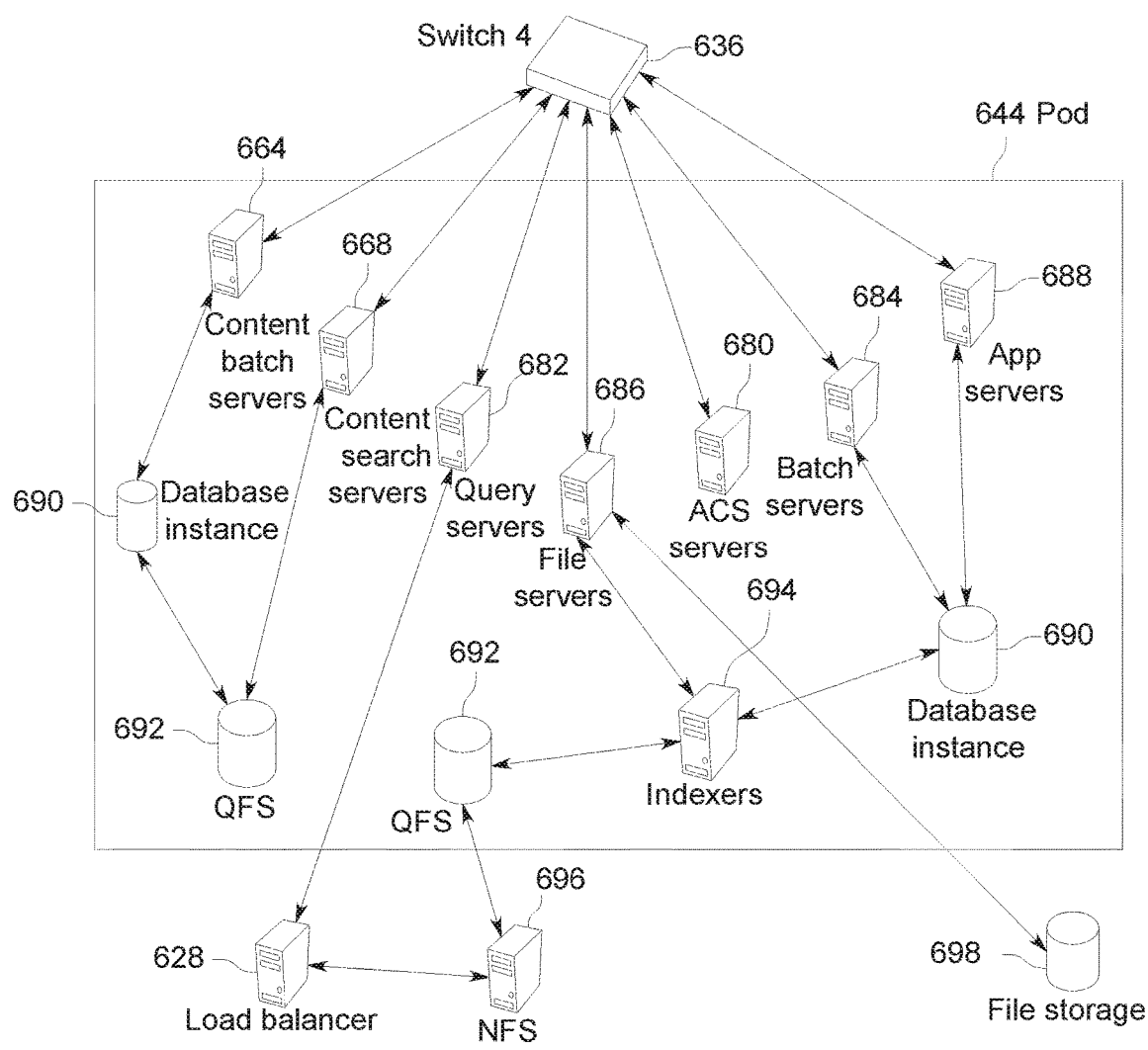
FIG. 6B shows a system diagram further illustrating an example of architectural components of an on-demand database service environment, in accordance with some implementations.

As shown in FIGS. 6A and 6B, accessing an on-demand database service environment may involve communications transmitted among a variety of different hardware and/or software components. Further, the on-demand database service environment 600 is a simplified representation of an actual on-demand database service environment. For example, while only one or two devices of each type are shown in FIGS. 6A and 6B, some implementations of an on-demand database service environment may include anywhere from one to many devices of each type. Also, the on-demand database service environment need not include each device shown in FIGS. 6A and 6B, or may include additional devices not shown in FIGS. 6A and 6B.

Moreover, one or more of the devices in the on-demand database service environment 600 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 604 is intended to refer to a data network or combination of data networks, often including the Internet. Client machines located in the cloud 604 may communicate with the on-demand database service environment to access services provided by the on-demand database service environment. For example, client machines may access the on-demand database service environment to retrieve, store, edit, and/or process information.

In some implementations, the edge routers 608 and 612 route packets between the cloud 604 and other components of the on-demand database service environment 600. The edge routers 608 and 612 may employ the Border Gateway Protocol (BGP). The BGP is the core routing protocol of the Internet. The edge routers 608 and 612 may maintain a table of IP networks or 'prefixes', which designate network reachability among autonomous systems on the Internet.

In one or more implementations, the firewall 616 may protect the inner components of the on-demand database service environment 600 from Internet traffic. The firewall 616 may block, permit, or deny access to the inner components of the on-demand database service environment 600 based upon a set of rules and other criteria. The firewall 616 may act as one or more of a packet filter, an application gateway, a stateful filter, a proxy server, or any other type of firewall.

In some implementations, the core switches 620 and 624 are high-capacity switches that transfer packets within the on-demand database service environment 600. The core switches 620 and 624 may be configured as network bridges that quickly route data between different components within the on-demand database service environment. In some implementations, the use of two or more core switches 620 and 624 may provide redundancy and/or reduced latency.

In some implementations, the pods 640 and 644 may perform the core data processing and service functions provided by the on-demand database service environment. Each pod may include various types of hardware and/or software computing resources. An example of the pod architecture is discussed in greater detail with reference to FIG. 6B.

In some implementations, communication between the pods 640 and 644 may be conducted via the pod switches 632 and 636. The pod switches 632 and 636 may facilitate communication between the pods 640 and 644 and client machines located in the cloud 604, for example via core switches 620 and 624. Also, the pod switches 632 and 636 may facilitate communication between the pods 640 and 644 and the database storage 656.

In some implementations, the load balancer 628 may distribute workload between the pods 640 and 644. Balancing the on-demand service requests between the pods may assist in improving the use of resources, increasing throughput, reducing response times, and/or reducing overhead. The load balancer 628 may include multilayer switches to analyze and forward traffic.

In some implementations, access to the database storage 656 may be guarded by a database firewall 648. The database firewall 648 may act as a computer application firewall operating at the database application layer of a protocol stack. The database firewall 648 may protect the database storage 656 from application attacks such as structure query language (SQL) injection, database rootkits, and unauthorized information disclosure.

In some implementations, the database firewall 648 may include a host using one or more forms of reverse proxy services to proxy traffic before passing it to a gateway router. The database firewall 648 may inspect the contents of database traffic and block certain content or database requests. The database firewall 648 may work on the SQL application level atop the TCP/IP stack, managing applications' connection to the database or SQL management interfaces as well as intercepting and enforcing packets traveling to or from a database network or application interface.

In some implementations, communication with the database storage 656 may be conducted via the database switch 652. The multi-tenant database storage 656 may include more than one hardware and/or software components for handling database queries. Accordingly, the database switch 652 may direct database queries transmitted by other components of the on-demand database service environment (e.g., the pods 640 and 644) to the correct components within the database storage 656.

In some implementations, the database storage 656 is an on-demand database system shared by many different organizations. The on-demand database service may employ a multi-tenant approach, a virtualized approach, or any other type of database approach. On-demand database services are discussed in greater detail with reference to FIGS. 6A and 6B.

FIG. 6B shows a system diagram further illustrating an example of architectural components of an on-demand database service environment, in accordance with some implementations. The pod 644 may be used to render services to a user of the on-demand database service environment 600. In some implementations, each pod may include a variety of servers and/or other systems. The pod 644 includes one or more content batch servers 664, content search servers 1068, query servers 682, file servers 686, access control system (ACS) servers 680, batch servers 684, and app servers 688. Also, the pod 644 includes database instances 690, quick file systems (QFS) 692, and indexers 694. In one or more implementations, some or all communication between the servers in the pod 644 may be transmitted via the switch 636.

The content batch servers 664 may handle requests internal to the pod. These requests may be long-running and/or not tied to a particular customer. For example, the content batch servers 664 may handle requests related to log mining, cleanup work, and maintenance tasks.

The content search servers 668 may provide query and indexer functions. For example, the functions provided by the content search servers 1068 may allow users to search through content stored in the on-demand database service environment.

The file servers 686 may manage requests for information stored in the file storage 698. The file storage 698 may store information such as documents, images, and basic large objects (BLOBs). By managing requests for information using the file servers 686, the image footprint on the database may be reduced.

The query servers 682 may be used to retrieve information from one or more file systems. For example, the query system 682 may receive requests for information from the app servers 688 and then transmit information queries to the NFS 696 located outside the pod.

The pod 644 may share a database instance 690 configured as a multi-tenant environment in which different organizations share access to the same database. Additionally, services rendered by the pod 644 may call upon various hardware and/or software resources. In some implementations, the ACS servers 680 may control access to data, hardware resources, or software resources.

In some implementations, the batch servers 684 may process batch jobs, which are used to run tasks at specified times. Thus, the batch servers 684 may transmit instructions to other servers, such as the app servers 688, to trigger the batch jobs.

In some implementations, the QFS 692 may be an open source file system available from Sun Microsystems® of Santa Clara, California. The QFS may serve as a rapid-access file system for storing and accessing information available within the pod 644. The QFS 692 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 668 and/or indexers 694 to identify, retrieve, move, and/or update data stored in the network file systems 696 and/or other storage systems.

In some implementations, one or more query servers 682 may communicate with the NFS 696 to retrieve and/or update information stored outside of the pod 644. The NFS 696 may allow servers located in the pod 644 to access information to access files over a network in a manner similar to how local storage is accessed.

In some implementations, queries from the query servers 622 may be transmitted to the NFS 696 via the load balancer 628, which may distribute resource requests over various resources available in the on-demand database service environment. The NFS 696 may also communicate with the QFS 692 to update the information stored on the NFS 696 and/or to provide information to the QFS 692 for use by servers located within the pod 644.

In some implementations, the pod may include one or more database instances 690. The database instance 690 may transmit information to the QFS 692. When information is transmitted to the QFS, it may be available for use by servers within the pod 644 without using an additional database call.

In some implementations, database information may be transmitted to the indexer 694. Indexer 694 may provide an index of information available in the database 690 and/or QFS 692. The index information may be provided to file servers 686 and/or the QFS 692.

In some implementations, one or more application servers or other servers described above with reference to FIGS. 5A and 5B include a hardware and/or software framework configurable to execute procedures using programs, routines, scripts, etc. Thus, in some implementations, one or more of application servers $50_1$-$50_N$ of FIG. 5B can be configured to implement components and initiate performance of one or more of the operations described above with reference to FIGS. 1-4 by instructing another computing device to perform an operation. In some implementations, one or more application servers $50_1$-$50_N$ carry out, either partially or entirely, one or more of the disclosed operations described with reference to FIGS. 1-4. In some implementations, app servers 688 of FIG. 6B support the construction of applications provided by the on-demand database service environment 600 via the pod 644. Thus, an app server 688 may include a hardware and/or software framework configurable to execute procedures to partially or entirely carry out or instruct another computing device to carry out one or more operations disclosed herein, including operations described above with reference to FIGS. 1-4. In alternative implementations, two or more app servers 1088 may cooperate to perform or cause performance of such operations.

Any of the databases and other storage facilities described above with reference to FIGS. 5A, 5B, 6A and 6B can be configured to store lists, articles, documents, records, files, and other objects for implementing the operations described above with reference to FIGS. 1-4. For instance, lists of available communication channels associated with share actions for sharing a type of data item can be maintained in tenant data storage 22 and/or system data storage 24 of FIGS. 5A and 5B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 5A, 5B, 6A and 6B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a server system comprising one or more processors in communication with one or more memory devices storing computer readable instructions that when executed by the one or more processors are configured to cause:
enabling a preconfigured waiting room site specific to a first site;
receiving, via an edge worker associated with a content delivery network (CDN), a first set of requests to access a first site;
determining that traffic to the first site is to be throttled;
responsive to determining that traffic to the first site is to be throttled, determining a throttling rate based at least in part on: a number of requests in the first set of requests and/or a degradation rate associated with a degradation in service capacity;
transmitting instructions to the edge worker, the instructions configured to cause the edge worker to direct at least a portion of a second set of requests to access the first site to the waiting room site prior to being directed to the first site, the direction of the at least the portion of the second set of requests to the waiting room site being subject to the throttling rate; and wherein the instructions to the edge worker comprise an indication of the throttling rate;
determining an update in performance due to throttling subject to the first throttling rate; and
determining whether to disable the preconfigured waiting room site based at least part on the update in performance.

2. The system of claim 1, wherein the throttling rate is determined based on a number of requests for the first site at which the degradation in service capacity occurred.

3. The system of claim 2, wherein the degradation in service capacity is identified based on a spike in CPU usage of the server system, a spike in CPU usage of an application server associated with the server system, and/or network usage information.

4. The system of claim 1, and wherein the waiting room site was preconfigured prior to determining that the traffic to the first site is to be throttled.

5. The system of claim 1, wherein the server system is further configurable to cause:
determining a response to throttling of traffic to the first site; and
transmitting updated instructions to the edge worker, wherein the updated instructions cause the waiting room site to be disabled and to cause a third set of requests to access the first site to be directed to the first site.

6. The system of claim 1, wherein the server system is further configurable to cause:
determining a response to throttling of traffic to the first site;
determining an updated throttling rate based on the response to the throttling of traffic to the first site; and
transmitting updated instructions to the edge worker, wherein the updated instructions cause a third set of requests to access the first site to be throttled subject to the updated throttling rate.

7. The system of claim 1, wherein the throttling rate is determined further based on traffic to a second site associated with the server system.

8. A non-transitory computer readable medium storing instructions that when executed by one or more processors is configurable to perform:
receiving, via an edge worker associated with a content delivery network (CDN), a first set of requests to access a first site;
determining that traffic to the first site is to be throttled;
responsive to determining that traffic to the first site is to be throttled, determining a throttling rate based at least in part on: a number of requests in the first set of requests and/or a degradation rate associated with a degradation in service capacity, wherein the degradation in service capacity is determined based on a spike in CPU usage of a server system associated with the first site or a spike in CPU usage of an application server associated with the server system; and
transmitting instructions to the edge worker, the instructions to the edge worker configured to cause the edge worker to direct at least a portion of a second set of requests to access the first site to a waiting room site prior to being directed to the first site, the direction of the at least the portion of the second set of requests to the waiting room site being subject to the throttling rate.

9. The non-transitory computer readable medium of claim 8, wherein the throttling rate is determined based on a number of requests for the first site at which the degradation in service capacity occurred.

10. The non-transitory computer readable medium of claim 9, wherein the degradation in service capacity is identified based on network usage information.

11. The non-transitory computer readable medium of claim 8, wherein the waiting room site is specific to the first site, and wherein the waiting room site was preconfigured prior to determining that the traffic to the first site is to be throttled.

12. The non-transitory computer readable medium of claim 8, wherein the instructions are configured to further cause:

determining a response to throttling of traffic to the first site; and transmitting updated instructions to the edge worker, wherein the updated instructions cause the waiting room site to be disabled and to cause a third set of requests to access the first site to be directed to the first site.

13. The non-transitory computer readable medium of claim 8, wherein the instructions are configured to further cause:

determining a response to throttling of traffic to the first site;

determining an updated throttling rate based on the response to the throttling of traffic to the first site; and transmitting updated instructions to the edge worker, wherein the updated instructions cause a third set of requests to access the first site to be throttled subject to the updated throttling rate.

14. The non-transitory computer readable medium of claim 8, wherein the throttling rate is determined further based on traffic to a second site associated with a datacenter that hosts the first site.

15. A method comprising:

receiving, via an edge worker associated with a content delivery network (CDN), a first set of requests to access a first site;

determining that traffic to the first site is to be throttled;

responsive to determining that traffic to the first site is to be throttled, determining a throttling rate based at least in part on: a number of requests in the first set of requests and/or a degradation rate associated with a degradation in service capacity, wherein the degradation in service capacity is determined based on a spike in CPU usage of a server system associated with the first site or a spike in CPU usage of an application server associated with the server system; and transmitting instructions to the edge worker, the instructions configured to cause the edge worker to direct at least a portion of a second set of requests to access the first site to a waiting room site prior to being directed to the first site, the direction of the at least the portion of the second set of requests to the waiting room site being subject to the throttling rate.

16. The method of claim 15, wherein the throttling rate is determined based on a number of requests for the first site at which the degradation in service capacity occurred.

17. The method of claim 16, wherein the degradation in service capacity is identified based on network usage information.

18. The method of claim 15, further comprising:

determining a response to throttling of traffic to the first site; and transmitting updated instructions to the edge worker, wherein the updated instructions cause the waiting room site to be disabled and to cause a third set of requests to access the first site to be directed to the first site.

19. The method of claim 15, further comprising:

determining a response to throttling of traffic to the first site;

determining an updated throttling rate based on the response to the throttling of traffic to the first site; and transmitting updated instructions to the edge worker, wherein the updated instructions cause a third set of requests to access the first site to be throttled subject to the updated throttling rate.

20. The method of claim 15, wherein the throttling rate is determined further based on traffic to a second site.

* * * * *